United States Patent [19]

Hölter et al.

[11] 4,366,132

[45] Dec. 28, 1982

[54] METHOD OF AND APPARATUS FOR THE CHEMISORPTIVE SCRUBBING OF WASTE GASES

[75] Inventors: Heinz Hölter, Beisenstrasse 39-41, 4390 Gladbeck, Fed. Rep. of Germany; Heinz Gresch, Dortmund, Fed. Rep. of Germany; Heinrich Igelbüscher; Heribert Dewert, both of Gladbeck, Fed. Rep. of Germany; Berthold Dzikowski, Essen, Fed. Rep. of Germany; Hans-Jürgen Twiehaus, Gladbeck, Fed. Rep. of Germany

[73] Assignee: Heinz Hölter, Gladbeck, Fed. Rep. of Germany

[21] Appl. No.: 240,892

[22] Filed: Mar. 5, 1981

[30] Foreign Application Priority Data

Mar. 7, 1980 [DE] Fed. Rep. of Germany ........ 3008718

[51] Int. Cl.³ .................... B01D 53/34; B01J 10/00
[52] U.S. Cl. ........................ 423/242; 55/228; 55/250; 55/259; 422/169; 422/225; 423/555
[58] Field of Search .............. 422/168, 169, 225; 423/242 R, 106, 109, 555; 55/228, 242, 250, 259

[56] References Cited

U.S. PATENT DOCUMENTS

| | | | |
|---|---|---|---|
| 3,789,585 | 2/1974 | Arnold et al. | 55/228 X |
| 3,791,109 | 2/1974 | Gustavsson | 423/242 R |
| 3,856,487 | 12/1974 | Perez | 55/259 X |
| 4,039,307 | 8/1977 | Bondor | 55/228 |
| 4,239,515 | 12/1980 | Yanagioka et al. | 422/168 X |
| 4,263,024 | 4/1981 | Vander Velden et al. | 55/228 X |

*Primary Examiner*—Bradley Garris
*Attorney, Agent, or Firm*—Karl F. Ross

[57] ABSTRACT

A method of and an apparatus for the scrubbing of waste gases and especially combustion gases by chemisorption. According to the invention combustion gases which can contain sulfur dioxide are scrubbed with water in the presence of lime and the scrubbing liquid is collected directly beneath the scrubbing column in an oxidation basin which is provided with means for introducing oxygen into the liquid to promote the formation of calcium sulfate crystals. The gases can sweep across the top of this basin and, at the outlet thereof, a coarse droplet separator is provided followed by a fine droplet separator or demister. Spray-water nozzles can be provided between the droplet separators for cleaning them.

2 Claims, 1 Drawing Figure

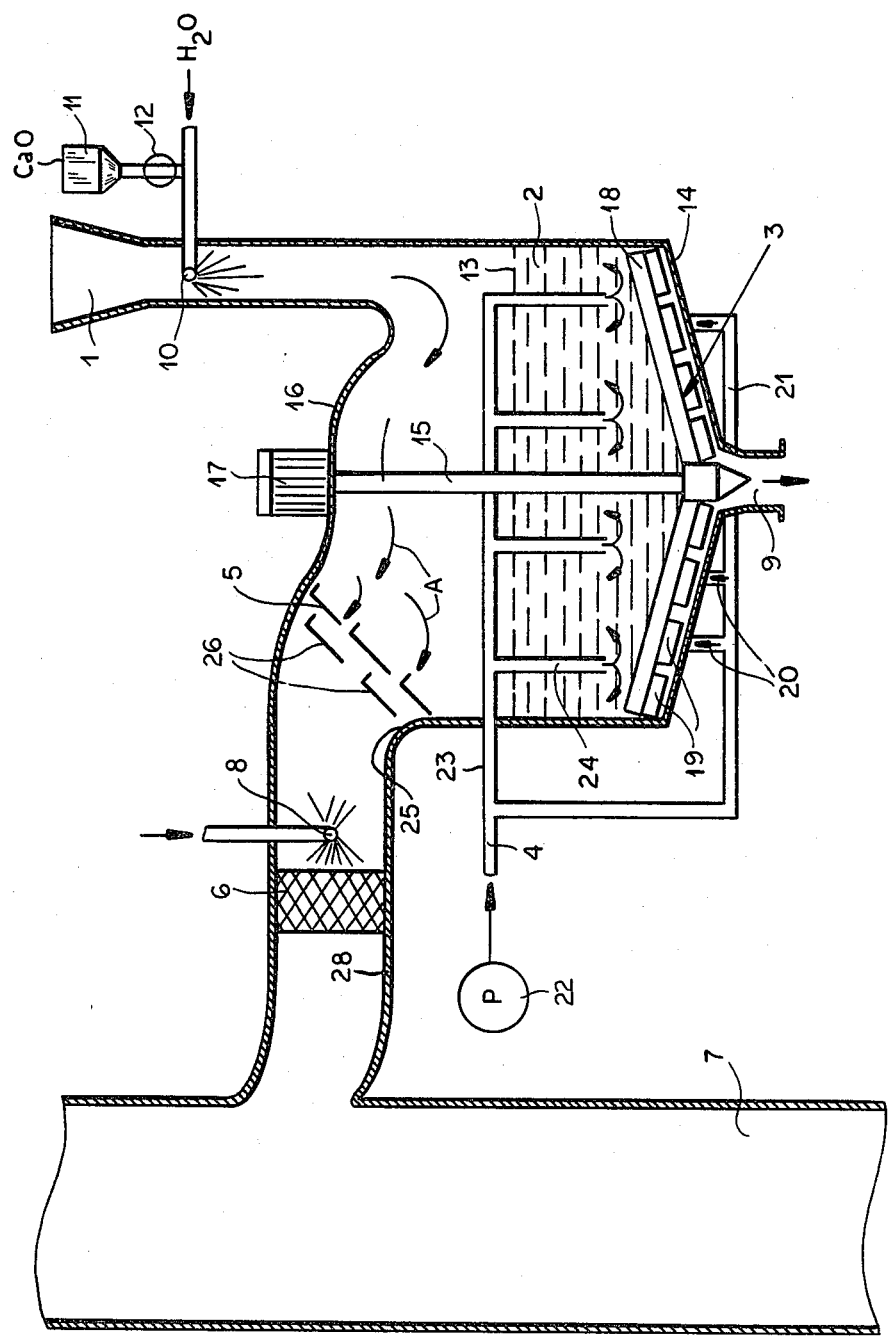

METHOD OF AND APPARATUS FOR THE CHEMISORPTIVE SCRUBBING OF WASTE GASES

FIELD OF THE INVENTION

Our present invention relates to gas-scrubbing installations and, more particularly, to a method of and an apparatus for the chemisorptive scrubbing of sulfur dioxide containing waste gases and especially furnace or combustion gases which are to be discharged into the atmosphere and can contain sulfur dioxide prior to scrubbing.

BACKGROUND OF THE INVENTION

Because of the increasing concern with environmental pollution it is a common practice to scrub waste or flue gases before they are to be discharged into the atmosphere in order to remove toxic, noxious and corrosive substances therefor. For example, in the case of combustion exhaust from oil and coal fired furnaces, e.g. in steam and other heating plants or in power plants, the gases to be discharged into the atmosphere and arising at the outlet of the combustion chamber may contain greater or lesser quantities of sulfur dioxide, depending upon the sulfur content of the fossil fuel which is used. Sulfur dioxide is a highly corrosive, toxic and noxious material which cannot be released into the atmosphere at the concentrations at which it may be present in many combustion gases under applicable environmental health and safety regulations.

It contributes to acid rain and endangers the natural environment especially forests and lakes, and when precipitated with rain in occupied areas, causes damage to paint, metal objects and the like while detrimentally affecting the health of the residents and animal life in the affected area.

It is thus known and required, in many instances, to provide scrubbers capable of washing sulfur dioxide inter alia from such combustion gas streams before they are discharged into the atmosphere. The scrubbers generally intensively mix water in finely divided form with the gas so that the scrubbing liquid acts in part as a mechanical trap, in part as a solvent and in part as an adsorbent for substances to be removed from the gas stream including the sulfur dioxide.

It is known, in this connection, to increase the scrubbing effectiveness of any scrubbing column capable of bringing about an intensive mixing of the gas and the liquid and an intimate contact therebetween, by promoting the chemisorptive effect, e.g. by addition of lime to the scrubbing liquid.

The lime (CaO) promotes removal of $SO_2$ from the gas phase by the formation of $CaSO_3$ therewith.

It is desirable, from a point of view of removing this material as a low solubility solid from the liquid, to form the calcium sulfate $CaSO_4$ by oxidation. However, when such oxidation occurs the calcium sulfate precipitates out almost immediately and encrustation of the ducts and passages therewith poses a significant problem.

In practice because the $SO_2$ concentration in the gas fluctuates, it is difficult to contrive the pH and calcium oxide content of scrubbing liquid and its quantity so that encrustation is avoided. Hence systems have been described in literature to overcome this disadvantage by incorporating in the wash liquid, oxidation-retarding agents. These oxidation-retarding agents are not only expensive but are inconvenient to use and hence involve other disadvantages.

OBJECTS OF THE INVENTION

It is the principal object of the present invention to provide an improved scrubbing apparatus whereby the disadvantages of earlier systems can be avoided.

Another object of the invention is to provide an improved scrubbing method or method of operating a scrubbing installation so that encrustation is avoided and yet a high gas cleaning efficiency can be obtained at low cost in spite of substantial fluctuation in the $SO_2$ content of the furnace gas to be cleaned.

SUMMARY OF THE INVENTION

These objects are attained in accordance with the present invention with an installation for the chemisorptive scrubbing of a furnace exhaust or stack gas which comprises a scrubbing stretch in which the stack gases are intimately contacted with the scrubbing liquid (water) containing the chemisorptive agent (e.g. lime).

According to the invention, the or each scrubbing stretch opens into an oxidation basin directly, preferably downwardly, while the oxidation basin has an outlet provided in succession with a coarse droplet separator and a fine droplet separator, advantageously having a spray nozzle arrangement between them for cleaning at least the fine droplet separator or demister.

According to the invention, the oxidation basin is an upwardly open vessel provided with a rotary rake inducing the calcium sulfate crystals to pass to an outlet or drain and above and below which means is provided for bubbling oxygen into the liquid in the basin.

The gases sweep across the top of the bath in the basin to the lateral outlet while the scrubbing stretches can be vertical columns which open directly downwardly into the basin.

In the method aspect of the invention the scrubbing stretches discharge directly into the oxidation basin before the gases are conducted across the top of the liquid therein and through the coarse droplet separator and fine droplet separator in succession.

The system of the invention eliminates the need for oxidation retarders and nevertheless avoids the encrustation or scaling problem because the oxidation is promoted in a basin which collects the liquids from the scrubbing stretches and into which any entrained liquid drains from the coarse droplet separator and demister.

BRIEF DESCRIPTION OF THE DRAWING

The above and other objects, features and advantages of the present invention will become more readily apparent from the following description, reference being made to the accompanying drawing in which the sole FIGURE is a diagrammatic vertical section through an installation for scrubbing stack gases and embodying the invention.

SPECIFIC DESCRIPTION

The apparatus shown in the drawing comprises one or more scrubbing columns or stretches 1 which can receive stack gases from one or more furnaces, the stack gases being previously subjected to cleaning if desired by solid-particle separators, e.g. of the cyclonic type.

The gas, which can contain sulfur dioxide, can be accelerated through the scrubbing stretch 1 past a spray head 10 through which the scrubbing solution is dispersed in the gas and intimately contacts the latter. The scrubbing solution can be water, preferably recycled after removal of solids therefrom, into which lime is metered, e.g. at a hopper 11 via the feeder 12.

The gases intimately contacted by the scrubbing solution are cleaned and the $SO_2$ is adsorbed in the liquid droplets which impinge directly upon the liquid surface 13 in an oxidation basin 2 provided directly below the scrubbing stretch 1.

The basin 2 is generally cylindrical and has a frustoconical bottom 14 provided with a central outlet 9 which can be provided with a valve (not shown) controlling the outflow to maintain a certain liquid level in the basin.

A rake 3 comprises a central upright shaft 15 which is journaled in the roof 16 of the basin and is driven by an electric motor 17. The arms 18 extend radially from the shaft 15 and are inclined inwardly and downwardly toward the axis of the basin and the outlet 9 thereof.

Arms 18 carry blades 19 which rake the calcium sulfate crystals and cause them to migrate to the outlet 9.

As previously described, the basin 2 is an oxidation basin. To this end the floor 14 at the basin is provided with bubblers 20 through which oxygen is fed via a manifold 21 contacted to a source of oxygen, e.g. a pipe 4 at the output side of an air compressor represented at 22.

To increase the agitation of the bath and the oxidation rate another manifold 23 can be provided with doubly extending bubbling pipes 24 opening above the rake.

The liquid from the scrubbing stretch 1 collects in the bath 13 while the scrubbed gas moves, as shown by arrows A, ultimately passing through a lateral outlet 25 at the side of the roof 16 of the oxidation basin opposite the scrubbing stretch 1. This outlet 25 is spanned by a coarse droplet separator 5 which is disposed above the oxidation stage and can consist of staggered baffles 26 collecting droplets by impingement and directional change, the collected liquid returning to the basin 2.

Downstream of the coarse separator 5 we provide a fine particle separator or demister 6, e.g. of the wire screen type in the lateral duct 28 running from the outlet 25 to the stack 7.

Between the two droplet separators 5 and 6 we provide a water spray device 8 which continuously or sporadically rinses the coarse particle separator and the fine particle separator from accumulated films.

Naturally, the system described need not have the precise configuration shown but it can utilize basins of other shape or other chemisorption systems in which an oxidation stage may be integrated. Thus, it need not serve exclusively for the scrubbing of $SO_2$ from a flue gas although this is preferred. It is important that the chemisorption scrubbing be followed directly in the gas wash by the oxidation phase which causes precipitation of the calcium sulfate crystals in the liquid of the basin so that these can be discharged and hence the solids are not formed in the gas phase so that encrustation might result.

We claim:

1. A chemisorptive gas washer for the scrubbing of sulfur dioxide from a stack gas, comprising:
    scrubbing means including at least one downwardly extending vertical duct provided with a stack gas inlet at its upper end, means below said upper end forming a scrubbing stretch for intimately contacting said gases with water forming a scrubbing liquid containing lime as a chemisorption agent, and a lower end of said duct forming an outlet;
    an oxidation basin disposed immediately below said stretch and containing a bath of scrubbing liquid receiving scrubbing liquid with said agent from said stretch, said basin having a cover above said bath, said outlet opening downwardly into said cover above said bath;
    means for bubbling oxygen into the water of said bath for oxidizing said agent in said basin to calcium sulfate, said cover being provided with discharge passage above said bath spaced from said outlet;
    a coarse droplet separator in said discharge passage for removing droplets from said gas;
    a fine droplet separator in said discharge passage downstream of said coarse droplet separator;
    a rake for advancing calcium sulfate crystals in said basin to an outlet; and
    nozzle means between said droplet separators and disposed to spray water upon at least said fine droplet separator.

2. The method of operating a gas washer comprising the steps of:
    scrubbing a stack gas containing sulfur dioxide with lime containing scrubbing water and passing a mixture thereof downwardly through a scrubbing stretch;
    collecting scrubbing liquid with calcium sulfite contained therein in an oxidation basin directly below said stretch so that liquid from said mixture is recovered in said basin and gas sweeps across the top of the liquid in said basin to an outlet therefrom;
    oxidizing the calcium sulfite to calcium sulfate in this basin thereby forming crystals of calcium sulfate therein;
    removing said crystals from said basin;
    discharging said gas through said outlet and through a coarse droplet separator and a fine droplet separator in succession; and
    spraying water upon at least said fine droplet separator.

* * * * *